United States Patent [19]
Burley et al.

[11] Patent Number: 5,001,558
[45] Date of Patent: Mar. 19, 1991

[54] NIGHT VISION SYSTEM WITH COLOR VIDEO CAMERA

[75] Inventors: Harvey A. Burley, W. Bloomfield; Richard J. Sweet, Huntington Woods, both of Mich.

[73] Assignee: General Motors Corporation, Detroit, Mich.

[21] Appl. No.: 743,418

[22] Filed: Jun. 11, 1985

[51] Int. Cl.$^5$ ............................................. H04N 5/333
[52] U.S. Cl. ..................................... 358/113; 358/166
[58] Field of Search ................. 358/113, 166, 169, 81, 358/211, 22, 41; 382/53

[56] References Cited

U.S. PATENT DOCUMENTS

| | | | |
|---|---|---|---|
| 2,716,193 | 8/1955 | Riolo | 250/215 |
| 3,571,504 | 3/1971 | Kiuchi et al. | 358/113 |
| 3,748,471 | 7/1973 | Ross et al. | 358/113 |
| 3,763,357 | 10/1973 | Morton | 382/53 |
| 3,806,633 | 4/1974 | Coleman | 358/81 |
| 3,971,068 | 7/1976 | Gerhardt et al. | 358/166 |
| 4,016,597 | 4/1977 | Dillon | 358/211 |
| 4,086,616 | 4/1978 | Catano et al. | 358/113 |
| 4,220,972 | 9/1980 | Geokezas et al. | 358/113 |
| 4,437,111 | 3/1984 | Inai | 358/211 |
| 4,868,652 | 9/1989 | Nutton | 358/113 |

FOREIGN PATENT DOCUMENTS 53-116729  12/1978  Japan.

OTHER PUBLICATIONS

"Common Aperture Techniques for Imaging Electro-Optical Sensors (Caties)", Feb. 1980, Engineering Staff, General Electric, Aircraft Equipment Div, Utica, N.Y.

Primary Examiner—James J. Groody
Attorney, Agent, or Firm—Warren D. Hill

[57] ABSTRACT

An infrared imager and a color TV camera view the same scene and the output signals are mixed and fed to a color television monitor so that the scene at night is visible in a black and white format with warm objects appearing dark, and bright colors such as lights appear in natural color superimposed on the black and white image.

4 Claims, 2 Drawing Sheets

NIGHT VISION SYSTEM WITH COLOR VIDEO CAMERA

FIELD OF THE INVENTION

This invention relates to a night vision system incorporating infrared imaging of a night scene with natural color enhancement.

BACKGROUND OF THE INVENTION

Systems for enhancing vision at night have been developed for military use, in particular, and usually comprise an infrared imaging device for producing a black and white television image. The differences in infrared radiation from objects in a scene lead to different responses so that there is sufficient contrast among different objects to produce clearly visible images. Some details, however, are not apparent in an infrared image; e.g. there may be no contrast between the letters and the background of a highway sign. The warm objects in a scene can result, as matter of choice, in either light or dark images according to the mode of electronic processing which is used. Such black and white images are useful in certain applications, particularly when being interpreted by trained observers.

It is desired to provide a night vision system which is not limited to trained observers but which may be readily used by the general public. For example, the operators of automotive vehicles or aircraft or water craft may benefit from night vision systems which allow viewing objects or events which are not visible to the unaided eye. In such applications, however, it is useful to recognize colors in the scene, particularly colored lights which are characteristic of traffic signals, vehicle directional or brake signals, navigation markers and the like. The colors can also make highway signs legible. It has previously been proposed to use false color display techniques to distinguish between images discerned by infrared and visible light cameras to aid in image interpretation, however, that too requires trained personnel to interpret the images since they have unnatural colors which can be misleading.

SUMMARY OF THE INVENTION

A general object of the invention is therefore to provide a night vision system yielding high visibility of non-illuminated scenes and including true color representation of lights or bright objects.

The invention is carried out by an infrared imager and a visible color imager arranged to view the same scene, a mixing circuit for combining the outputs of the imaging devices and a color display responsive to the mixed signals to image the scene based on the infrared information with warm objects appearing dark but with superimposed bright objects appearing in natural color.

The above and other advantages of the invention will become more apparent from the following description taken in conjunction with the drawings wherein like reference numerals refer to like parts.

DESCRIPTION OF THE PREFERRED EMBODIMENT

The invention is well suited to application in automotive vehicles to supplement the operators natural vision during night driving. The embodiment of the invention is described in that context, however, the invention is by no means limited to such use. Vehicles other than automotive land vehicles can benefit from such night vision enhancement, and stationary installations can also utilize the system for night surveillance of a scene. In particular, the night vision enhancement is appropriate wherever it is desirable to clearly view poorly illuminated portions of a scene and at the same time to view lights and bright objects in the scene in their natural color in order to properly interpret traffic signals, navigation signals, vehicle directional signals, and the like.

Figure 1:
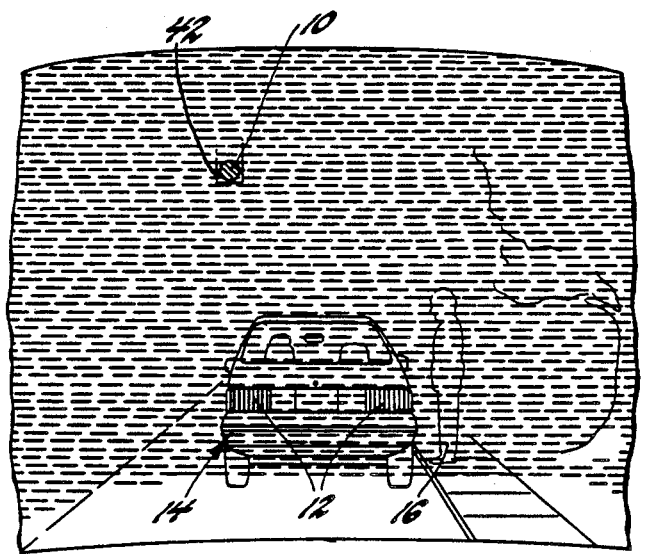
FIG. 1 is a view of a poorly illuminated street scene as perceived by the unaided eye.

FIG. 1 shows a dimly lit night scene as viewed from a vehicle having headlights illuminating only the area immediately in front of the vehicle. In that scene the green light 10 of a traffic signal and the red tail lamps 12 of an automobile 14 are easily seen and the automobile 14 itself is fairly well illuminated by the headlights. A person 16 adjacent the automobile 14 is poorly illuminated and may not be easily noticed. Other surroundings are not visible, especially on a very dark night.

Figure 2:
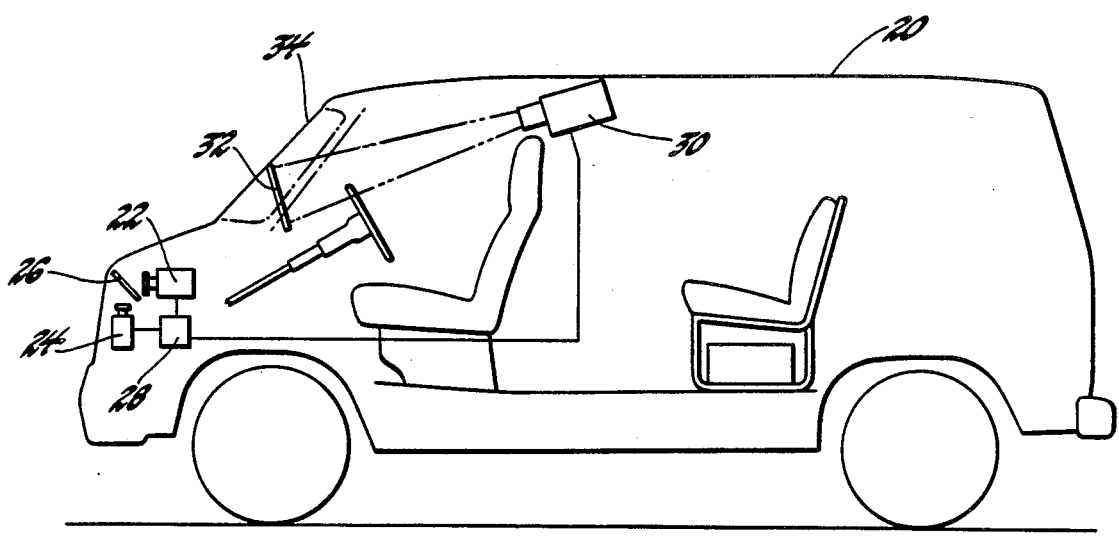
FIG. 2 is an outline elevation of a vehicle equipped with a night vision system shown in block form according to the invention.

FIG. 2 illustrates a vehicle 20 equipped with a night vision enhancement system. The system includes an infrared imaging device 22 and a visible light color pickup device 24 hereinafter referred to as an infrared camera 22 and a color camera 24, each being commercially available and well known in the art. An infrared camera operating in the far infrared or the mid infrared spectrum is preferred because most objects in outdoor scenes are quite visible at those wavelengths. The near infrared spectrum is also usable but is less suitable largely because the headlights of vehicles emit a large amount of radiation in that region and thus the headlights of oncoming vehicles produce a blooming effect in the infrared camera resulting in an enlarged head lamp image. The cameras are arranged to synoptically view the scene, that is, to view the same scene from the same point of view so that there is no parallax effect and their images are registered when combined. To this end a mirror 26 transparent to infrared is used to selectively pass the infrared light to the infrared camera 22 and reflect visible light to the color camera 24. The cameras and mirror are located in a position within the vehicle affording a forward view of the environment. Outputs of the cameras 22 and 24 are fed to a signal combiner and synchronizer 28 which is also well known commercially available equipment. The mixed signal then is fed to a color monitor such as a video projector 30 which casts an image onto a screen 32 positioned near the vehicle windshield 34 for easy viewing by the vehicle operator. Of course, it is not necessary to use a video projector and screen since other color television displays can be used.

Figure 3:
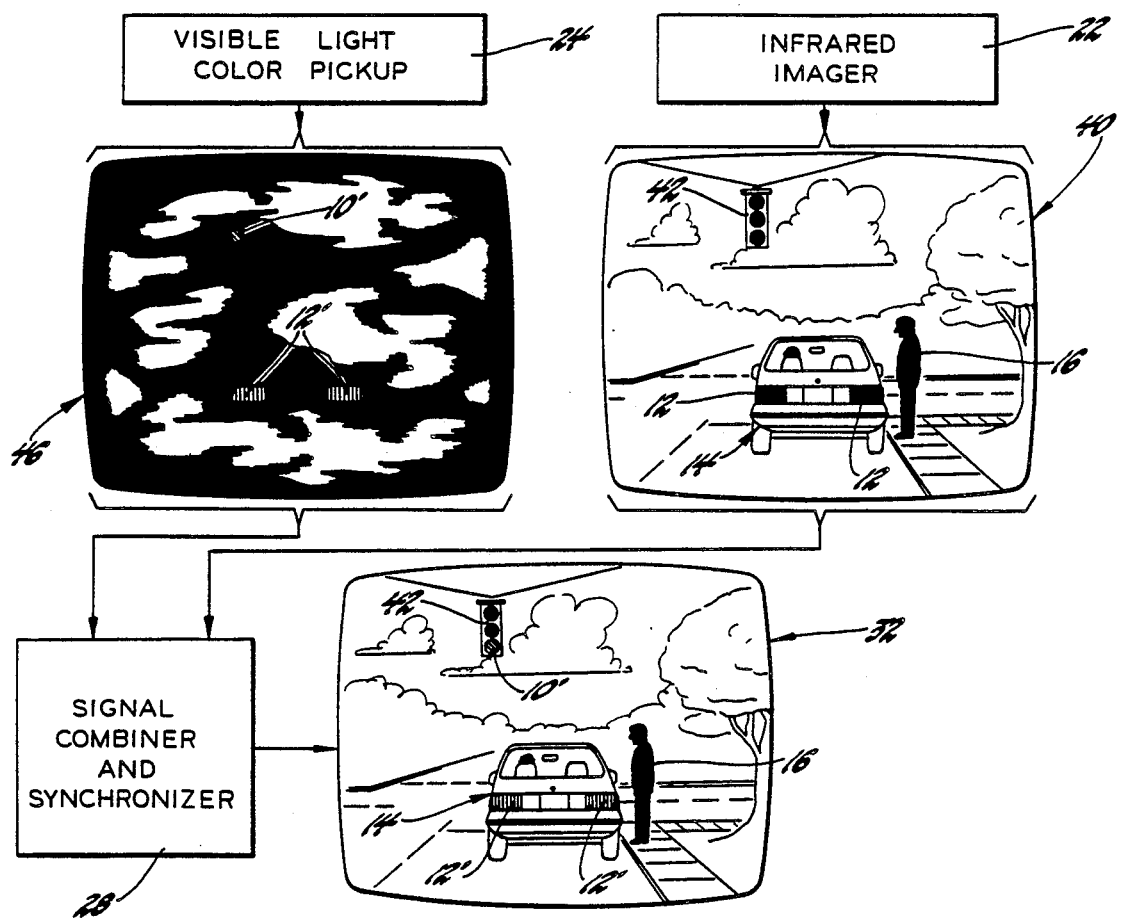
FIG. 3 is a block diagram of the night vision system of FIG. 2 with illustrations of the individual camera images and the resultant image of the scene of FIG. 1.

As shown in FIG. 3, the infrared camera 22 is operated in a mode wherein warm objects appear to be dark and cold objects appear to be light. Thus as depicted in the inset 40 the three lenses of the traffic signal 42 appear dark because they have been heated by their respective light sources. The traffic signal housing itself which does not share that heat is at a lower temperature and appears to be light gray and the night sky is usually very light. The warm tail lamps 12 of the vehicle 14 appear black and the person 16 is dark because of natural body heat. Other objects in the environment not being very warm are generally light but they do vary in the amount of infrared radiation emitted so that there is contrast between different objects and the images thereof are quite visible. Summer and winter temperature variations influence the infrared image but manual sensitivity adjustments readily correct for that. It is preferred to select an image brightness which renders the pavement as light gray.

As shown in the inset 46 the color video camera 24 emits a signal representing the bright colors in the scene. Thus the green traffic light image 10' and the red tail light images 12' are picked up. In addition, reflective stop signs or reflective green or blue highway informational signs would also impress color images on the camera signal. When the signals are mixed in the signal combiner and synchronizer circuit 28, the color signals from the camera 24 register with the black signals from the camera 22 so that as shown in the video display 32 the green light 10' is superimposed on the corresponding dark lens of the infrared image and similarly the red tail lamp image 12' is superimposed on the corresponding black portion of the infrared image. Warm objects which are not emitting light remain black as in the case of the non-illuminated lenses of the traffic signal and the person 16 who is clearly visible. White lights such as street lamps and vehicle head lights will appear white in the combined image. Thus the overall image is black and white enhanced with true color lights. Bright objects such as reflective stop signs or highway informational signs illuminated, say, by vehicle headlights will also be sensed by the color camera to yield color images. The infrared image will be gray, if the object is cool, so that the displayed image of the object will be a diluted or subdued color which nonetheless provides enough contrast to render the sign legible.

Figure 4:
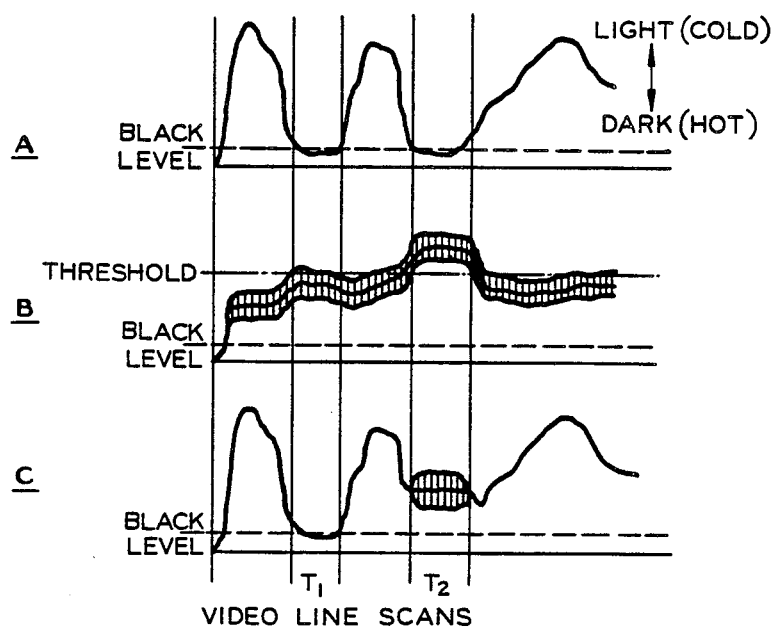
FIG. 4 is a set of video waveforms illustrating the signal mixing according to the invention.

The proper balance of the two video signals can be adjusted to optimize the desired effect in the resultant image. The curves of FIG. 4 illustrate exemplary video line scans where line "A" shows the monochromatic video signal from the infrared camera, line "B" shows the color video signal and line "C" is the signal after mixing. For each signal there is a black level below which a black image will be recorded. In the line "A" two black portions of the image occur at time periods $T_1$ and $T_2$. In line "B" the color video signal remains above the black level, however, a threshold is selected such that only color signals higher than the threshold are utilized in the mixed signal. Accordingly, only the time period $T_2$ contains a sufficient color level to affect the output image. The combined values of the monochromatic video and the thresholded color video are shown in line "C". The period $T_2$ contains the color image and the remainder of the line is the same as the the monochromatic video signal, the time period $T_1$ representing a dark image. Thus the time periods $T_1$ and $T_2$ both represent warm objects but only the period $T_2$ has a bright visible light associated with it.

It will thus be seen that this invention takes advantage of established infrared imaging technology to produce useful images of a poorly illuminated scene and improves upon that technology by adding real color images of lights or other bright objects in the visible spectrum to produce a combined image which is easily interpreted by unskilled observers thereby being useful to the general public.

The embodiments of the invention in which an exclusive property or privilege is claimed are defined as follows:

1. A night vision enhancement system comprising:
   a color monitor,
   means for displaying on the color monitor a monochrome image of a dimly lighted scene with a true color image of bright objects superimposed on the monochrome image, including
   an infrared imager viewing the scene and generating a monochrome signal,
   a color pickup viewing the same scene from the same viewpoint and generating a color signal representing lighted objects in the scene, and
   mixing means for combining and synchronizing the monochrome and color signals and transmitting the combined signal to the monitor, whereby the monitor displays a monochrome image of the scene with true color highlights imposed thereon.

2. A night vision enhancement system comprising:
   a color monitor,
   means for displaying on the color monitor a monochrome image of a dimly lighted scene with a true color image of bright objects superimposed on the monochrome image, including
   an infrared imager viewing the scene and generating a black and white monochrome signal representing warm objects in the scene as dark images and cold objects as light images,
   a color pickup viewing the same scene from the same viewpoint and generating a color signal representing lighted objects in the scene, and
   mixing means for combining and synchronizing the monochrome and color signals and transmitting the combined signal to the monitor, whereby the monitor displays a monochrome image of the scene with true color highlights imposed thereon.

3. A night vision enhancement system comprising:
   a color monitor;
   means for displaying on the color monitor a monochrome image of a dimly lighted scene with a true color image of bright objects superimposed on the monochrome image, including
   an infrared imager sensitive to the far infrared spectrum and insensitive to visible light for viewing the scene and generating a monochrome signal,
   a color pickup viewing the same scene from the same viewpoint and generating a color signal representing lighted objects in the scene, and
   mixing means for combining and synchronizing the monochrome and color signals and transmitting the combined signal to the monitor, whereby the monitor displays a monochrome image of the scene with true color highlights imposed thereon.

4. A night vision enhancement system comprising;
   a color monitor,
   means for displaying on the color monitor a monochrome image of a dimly lighted scene with a true color image of bright objects superimposed on the monochrome image, including
   an infrared imager sensitive to the mid infrared spectrum for viewing the scene and generating a monochrome signal independently of visible light,
   a color pickup viewing the same scene from the same viewpoint and generating a color signal representing lighted objects in the scene, and
   mixing means for combining and synchronizing the monochrome and color signals and transmitting the combined signal to the monitor, whereby the monitor displays a monochrome image of the scene with true color images imposed thereon.

* * * * *